June 16, 1931.    L. D. SOUBIER    1,810,736
GLASS FEEDER
Filed Dec. 27, 1928
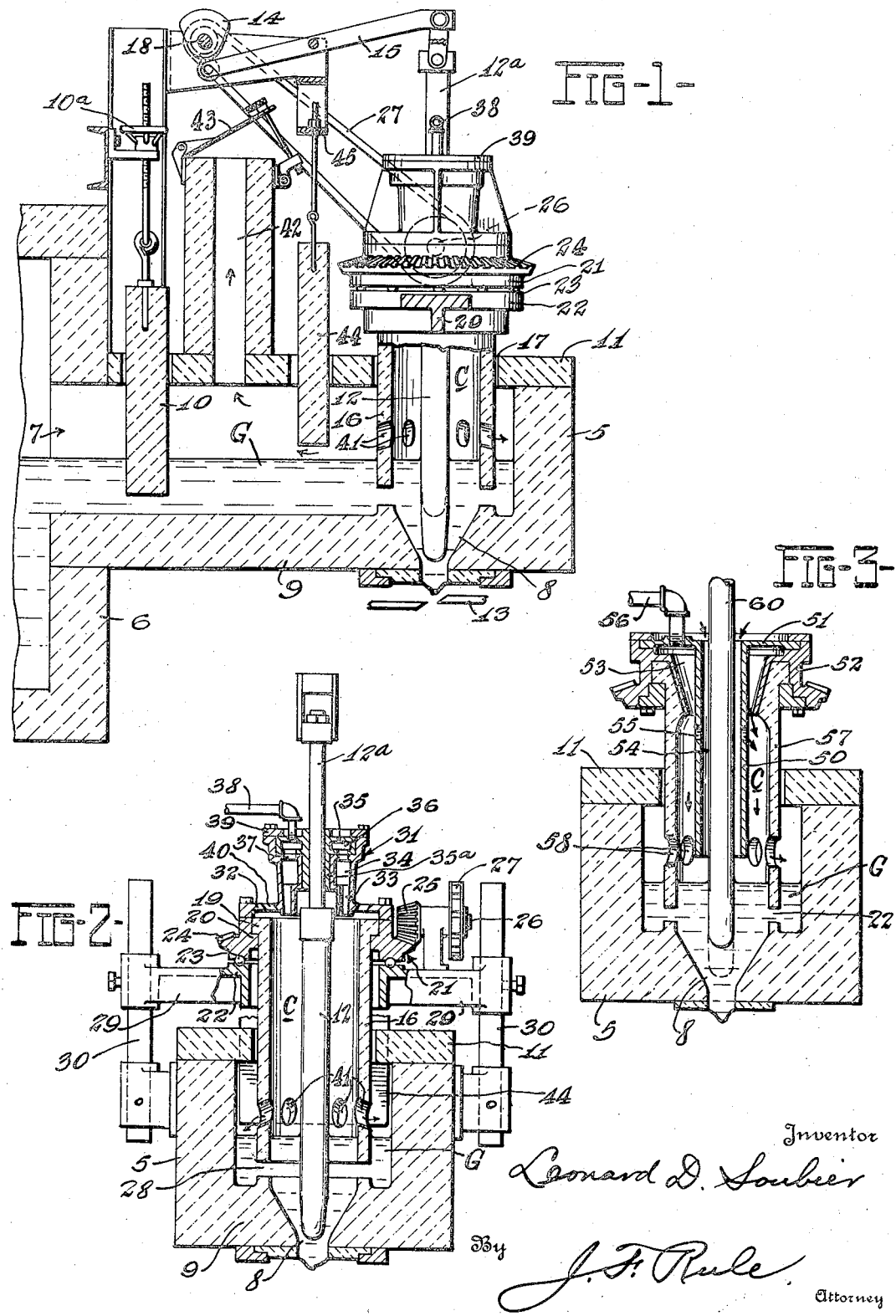
Inventor
Leonard D. Soubier
By J. F. Rule,
Attorney

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS FEEDER

Application filed December 27, 1928. Serial No. 328,679.

The present invention relates to improvements in glass feeders, and more particularly to means to obtain and maintain uniform temperature conditions thruout charges of glass being delivered to the molds of machines for forming glassware.

The type of feeder to which the present invention relates, ordinarily comprises a boot or lateral extension on one wall of a melting tank, and a bottom outlet orifice near the outer end of the boot. The molten glass flows from the tank into one end of the boot and thence to and thru the bottom outlet orifice after which it is separated into mold charges which are delivered by gravity to the molds.

Because of the relatively small dimensions of the boot and the remoteness of the bottom outlet orifice from the primary heating means for the glass, the temperature of the glass lowers appreciably as it approaches the outlet orifice. The drop in temperature is generally objectionable in itself. However, this change in temperature constitutes a further detriment in that it is seldom uniform thruout the glass and therefore results in cold streaks which produce defects in the glassware.

An object of the present invention is to provide means to avoid the above objections by maintaining uniform temperature conditions thruout the glass in the boot and outlet orifice. To this end there is provided means to apply heat to the glass in proximity to the outlet orifice and conduct the heat rearwardly over the glass in the boot to an exhaust stack to thereby cause a gradual rise in temperature of the glass as it approaches the front end of the boot, or at least prevent any objectionable drop in temperature between the tank and bottom outlet orifice.

Another object is to regulate and predetermine the path of travel of the heat thru the boot in a fashion to permit variance of its effectiveness in reheating the glass in the boot. To this end, a baffle is projected into the boot between the usual exhaust stack and point of application of heat and supported by means providing for adjustment of the lower end of the baffle toward and from the surface of the glass. Thus the area of the passageway between the baffle and glass may be varied at will and the degree of intensity with which the heat is applied to the glass thereby regulated.

A further object is to provide a novel form of combustion chamber and means to counduct heat to the surface of the glass over the outlet orifice. To this end the usual rotary sleeve or tube is projected downwardly into the glass over the outlet orifice and formed to provide a combustion chamber as well as an agitating and stirring implement.

Other objects of the invention will appear hereinafter.

In the drawings:

Fig. 1 is a sectional elevation of the invention.

Fig. 2 is a transverse sectional view.

Fig. 3 is a detail sectional view of another form of the invention.

The preferred embodiment of my invention (Figs. 1 and 2) comprises a furnace extension or boot 5 projecting laterally from one wall of a melting tank 6. Molten glass "G" flows from the tank 6 thru a wall opening 7 into the boot 5 and thence forwardly to and thru a bottom outlet orifice 8 in the floor 9 of the boot. Flow of glass into the boot and the depth of the glass therein are regulated by a gate or block 10 which extends downwardly thru the cover 11 of the boot at a point adjacent the inner end thereof and projects any desired distance into the glass. An adjusting wheel 10$^a$ is manually operable to regulate the extent to which the gate 10 projects into the glass. Discharge of glass thru the outlet orifice 8 is controlled, in part, by a plunger 12 which projects into the glass in register with said outlet orifice 8. This plunger 12 is reciprocated vertically by a rotary cam 14 and lever 15 in the usual manner to alternately accelerate and retard outflow of the glass and to "neck in" the issuing stream at regular time intervals preparatory to severance of the latter into mold charges by shears 13.

Uniformity of temperature conditions in the issuing glass is maintained in part by rotation of a tube or sleeve 16 which projects into the glass in axial alignment with the outlet orifice 8. This tube 16 extends upwardly thru an opening 17 in the boot cover 11 and is formed with a flange 19 (Fig. 2) which rests upon an annular shoulder 20 on a circular frame 21 rotatively supported on a bearing plate 22 and spaced upwardly therefrom by anti-friction balls 23. A ring gear 24 is carried by the circular frame 21 and runs in mesh with a driving pinion 25, the latter being fixed to one end of a horizontal shaft 26 which is rotated by any suitable means (not shown) thru a sprocket chain 27 and cam shaft 18. If preferred, the tube 16 may be held against rotation.

The tube 16 is adjustable vertically to change the area of the annular passageway 28 thru which glass flows to the outlet orifice 8 and thereby provide for variation of the rate of flow of the glass to the outlet orifice 8. Accordingly a pair of arms 29 are formed on the bearing plate 22 and are vertically adjustable on uprights 30 suitably mounted upon the boot 5.

The tube or sleeve 16 also functions as a combustion chamber as previously suggested. It also serves as means to direct intense heat to the surface of glass over and in proximity to the outlet orifice 8. To this end a fuel injector 31 is arranged at the upper end of the tube 16 to direct fuel gas or the like into the combustion chamber C formed by the tube. This fuel injector 31 comprises a cap plate 32 fixed to the upper face of the circular frame 21 and formed with an annular series of downwardly opening ports 33 which lead from an annular chamber 34 to the combustion chamber C. This annular chamber 34 (Fig. 2) is in constant communication with the interior of a stationary distributor 35 for fuel gas or the like, having an annular opening 36 extending downwardly for register with ports 37 leading to the annular chamber 34.

The distributor 35 carries a tubular guide 35ª extending downwardly between the rotary portion of the injector 31 and the plunger carrier 12ª, the latter being adapted for reciprocation thru the guide. A retaining ring 39 holds the distributor 35 in proper position relative to the chamber 34 while permitting rotation of the tube and parts of the injector carried thereby. A supply pipe 38 for fuel gas or the like is connected to the distributor 35. Air for mixture with the fuel gas in the combustion chamber C is introduced into said chamber thru ports 40 (Fig. 2) in the cap plate 32. Outlet ports 41 near the lower end of the tube permit exhaust of products of combustion from the chamber C to the remaining portions of the boot 5.

The most effective portions of the products of combustion are applied to the surface of the glass within the tube 16 directly over the outlet orifice 8 and to portions of the glass in proximity to the outer wall of said tube. The effectiveness of the heat as it moves rearwardly is gradually decreased. However, the glass in the boot is hottest near the furnace outlet 7 so that it is unnecessary to apply any great amount of heat thereto. The tendency of the heat temperature to lower as it moves rearwardly in the boot, and of the glass temperature to drop as it approaches the bottom outlet 8 creates a more or less balanced temperature condition in the boot and glass contained therein. The intensity of the applied heat may be controlled by regulating the flow of fuel gas to the injector. This of course controls to a considerable extent the viscosity of the issuing glass.

The products of combustion exhausted from the tube 16 by way of the ports 41 move rearwardly thru the boot and over the surface of the glass to an exhaust stack 42 which rises from the cover of the boot. An adjustable damper 43 is mounted on the upper end of the stack 42 to control the draft and therefore the rate of exhaust of products of combustion from the boot. The path of travel of the products of combustion in their movement from the combustion chamber C to the stack 42 determines to a considerable degree their effectiveness as a means for raising the temperature of the glass moving toward the outlet orifice 8.

A vertically adjustable gate 44 is suspended from a hanger 45 and extends across the interior of the boot with its lower end above the glass level and between the tube 16 and stack 42. By changing the position of this gate the path of travel of the products of combustion to the stack 42 is correspondingly changed. If the gate 44 is adjusted so that its lower end is quite close to the surface of the glass, the products of combustion are forced to follow a path which will cause extremely intimate contact between said products of combustion and the surface of the glass. Also the position of the lower end of the gate 44 relative to the surface of the glass assists in controlling the effectiveness of the heat by regulating to some degree the pressure of heat in the front end of the boot. By raising the gate 44 the area of the passageway beneath the gate is increased so that the products of combustion may more easily flow to the stack 42 and be less effective as a glass reheating medium and flow more quickly to the stack 42.

In another form of the invention (Fig. 3) the construction is such that the plunger 60 is protected to a considerable degree against the effect of the intense heat within the tube 57. To this end the structure includes a stationary sleeve 50 surrounding a major portion of the plunger 60 and formed with a radial flange 51 at its upper end upon which the supporting ring 52 for the tube 57 is rotatively mounted. The flange 51 forms the upper wall of a fuel chamber 53 which tapers downwardly and opens into the upper end of the rotary tube 57. The sleeve 50 which forms one wall of the fuel chamber 53 is spaced from the plunger to form with the latter an annular passageway 54 which is open at both ends whereby outside air may enter the passageway to prevent excessive heating of the plunger 12. Portions of the air entering this passageway 54 are exhausted thru radial ports 55 in proximity to the lower end of the fuel chamber 53 for mixture with fuel gas which is injected into the upper end of the tube 57.

In the form shown in Fig. 3 fuel gas or the like is supplied to the fuel chamber 53 by way of the supply pipe 56, such fuel entering the upper end of the tube 57 and immediately mixing with air which is introduced thru the annular passageway 54 and ports 55. The products of combustion are applied to the surface of the glass in the same manner as in the preceding form and are discharged from the tube by way of ports 58. The remaining structure, by which is controlled the effectiveness of the products of combustion as a heating medium for the glass outside of the tube, may be the same as that previously described.

Modifications may be resorted to within the spirit and scope of the appended claims.

What I claim is:

1. In a glass feeder the combination of a container for molten glass having a bottom outlet orifice, means to supply molten glass to the container, means to control gravity issue of glass thru the outlet orifice, a tube projecting into the glass in register with the orifice, said tube having a radial opening just above the level of the glass in the container, and means to introduce fuel into the tube for combustion therein whereby the glass directly over and in proximity to the outlet orifice may be reheated.

2. In a glass feeder the combination of a container for molten glass having a bottom outlet orifice, means to supply molten glass to the container, means to control gravity issue of glass thru the outlet orifice, a tube projecting into the glass in register with the orifice, said tube having a radial opening just above the level of the glass in the container, means to introduce fuel into the tube for combustion therein whereby the glass directly over and in proximity to the outlet orifice may be reheated, and an exhaust stack thru which the products of combustion are removed from the container.

3. In a glass feeder the combination of a container for molten glass having a bottom outlet orifice, means to supply molten glass to the container, means to control gravity issue of glass thru the outlet orifice, a tube projecting into the glass in register with the orifice, said tube having a radial opening just above the level of the glass in the container, means to introduce fuel into the tube for combustion therein whereby the glass directly over and in proximity to the outlet orifice may be reheated, an exhaust stack thru which the products of combustion are removed from the container, and means whereby the path of travel and rate of flow of the products of combustion to the exhaust stack may be varied.

4. In a glass feeder the combination of a container for molten glass having a bottom outlet orifice, means to supply molten glass to the container, means to control gravity issue of glass thru the outlet orifice, a tube projecting into the glass in register with the orifice, said tube having a radial opening just above the level of the glass in the container, means to introduce fuel into the tube for combustion therein whereby the glass directly over and in proximity to the outlet orifice may be reheated, an exhaust stack thru which the products of combustion are removed from the container, a vertically adjustable gate extending transversely of the path of travel of the products of combustion to said exhaust stack, and means to vary the vertical position of said gate to thereby change the path of travel and rate of flow of the products of combustion and thereby regulate their effectiveness as a heating medium for the glass.

5. In a glass feeder the combination of a container for molten glass having a bottom outlet opening near one end, means to supply molten glass to the container, a rotary tube projecting into the glass in register with the outlet orifice, said tube having radial openings adjacent its lower end and above the level of the glass in said container, means to rotate the tube, and means to apply heat to the glass over and in proximity to the outlet orifice by way of said tube and openings.

6. In a glass feeder the combination of a container for molten glass having a bottom outlet opening near one end, means to supply molten glass to the container, a rotary tube projecting into the glass in register with the outlet orifice, said tube having radial openings adjacent its lower end and above the level of the glass in said container, means to rotate the tube, means to apply heat to the glass over and in proximity to the outlet orifice by way of said tube and openings, and means to adjust the tube to change the vertical spaced relation between the surface of the glass and said openings.

7. In a glass feeder the combination of a container for molten glass having a bottom outlet opening near one end, means to supply molten glass to the container, a rotary tube projecting into the glass in register with the outlet orifice, said tube having radial openings adjacent its lower end and above the level of the glass in said container, means to rotate the tube, means to apply heat to the glass over and in proximity to the outlet orifice by way of said tube and openings, means to exhaust the products of combustion from the container at a point spaced horizontally from the tube, and adjustable means to retard flow of the products of combustion to the stack and thereby cause intimate contact between said products of combustion and the glass during movement of the former to the exhaust means.

8. In a glass feeder the combination of a container for molten glass having a bottom outlet opening near one end, means to supply molten glass to the container, a rotary tube projecting into the glass in register with the outlet orifice, said tube having radial openings adjacent its lower end and above the level of the glass in said container, means to rotate the tube, means to apply heat to the glass over and in proximity to the outlet orifice by way of said tube and openings, means to exhaust the products of combustion from the container at a point spaced horizontally from the tube, a vertically adjustable gate extending transversely of the path of travel of the products of combustion to the exhaust means, and means to adjust said gate toward and from the surface of the glass to thereby change the cross-sectional area of a portion of said path of travel.

9. In a glass feeder the combination of a container for molten glass having a bottom outlet opening near one end, means to deliver glass into the other end of said container, a plunger projecting into the glass in register with said outlet opening, means to reciprocate the plunger vertically to alternately accelerate and retard issue of glass thru said outlet opening, a tube projecting into the glass and surrounding a portion of the plunger and having radial openings near its lower end, means to supply heat to the interior of the tube, and means disposed between the tube and plunger to protect a major portion of the latter against the heat within the tube.

10. In a glass feeder the combination of a container for molten glass having a bottom outlet opening near one end, means to deliver glass into the other end of said container, a plunger projecting into the glass in register with said outlet opening, means to reciprocate the plunger vertically to alternately accelerate and retard issue of glass thru said outlet opening, a tube projecting into the glass and surrounding a portion of the plunger and having radial openings near its lower end, means to supply heat to the interior of said tube, and means disposed between the tube and plunger to protect a major portion of the latter against the heat within the tube, said protecting means being formed to admit outside air for contact with the plunger.

11. In a glass feeder the combination of a container for molten glass having a bottom outlet orifice near one end, a rotary tube vertically aligned with said outlet orifice and projecting into the glass in said container, said tube having an outlet opening near its lower end, a fuel injector at the upper end of said tube adapted to rotate with the latter, a stationary distributor associated with the injector, means to supply fuel to the distributor and thence to the injector for introduction into said tube, and means to admit air into the upper end of the tube for mixture with the injected fuel.

12. The combination in a glass feeder of a container for molten glass having a bottom outlet opening, means to control issue of glass thru said opening including a tube projecting into the glass over the opening, and means to supply heat to the interior of the tube to reheat portions of the glass in the container.

13. The combination in a glass feeder of a container for molten glass having a bottom outlet opening, means to control issue of glass thru said opening including a tube projecting into the glass over the opening and formed with a series of outlet ports, and means to supply heat to the container by way of the ports and lower end of the tube to reheat at least portions of the glass in the container.

14. In a glass feeder, the combination of a container for molten glass having a bottom outlet orifice, means for supplying molten glass to the container, means for controlling the discharge of glass through the outlet orifice, means providing a heat confining chamber within the container arranged to apply heat directly to a restricted area of glass over said orifice, and means for supplying heat to said chamber.

15. In a glass feeder, the combination of a container for molten glass having a bottom outlet orifice, means for supplying molten glass to the container, means for controlling the discharge of glass through the outlet orifice, a tube extending downward into the container over the outlet, and means for supplying a heating fluid within said tube and applying it directly to the glass over the outlet orifice.

16. In a glass feeder, the combination of a container for molten glass having a bottom outlet orifice, means for supplying molten glass to the container, means for controlling the discharge of glass through the outlet orifice, a tube extending downward into the container over the outlet, a burner associated with said tube and supplying heat therein, the heat being applied directly to the glass over the outlet, and means for directing the products of combustion from said tube through the container in contact with the glass exterior to said tube.

17. The combination of a glass furnace, a forehearth extension thereof providing a container into which glass flows from the furnace, said extension having a bottom outlet opening, a tube extending downward into the container over the outlet, and a burner supplying heat within said tube and applying it to the glass over the outlet.

18. The combination of a glass furnace, a forehearth extension thereof providing a container into which glass flows from the furnace, said extension having a bottom outlet opening, a tube extending downward into the container over the outlet, a burner supplying heat within said tube and applying it to the glass over the outlet, an implement extending downward through said tube into the glass over the outlet, and means for periodically actuating said implement to control the discharge of glass through the outlet.

19. The combination of a glass furnace, a forehearth extension thereof providing a container into which glass flows from the furnace, said extension having a bottom outlet opening, a tube extending downward into the container over the outlet, a burner supplying heat within said tube and applying it to the glass over the outlet, a stack communicating with the container between the furnace and said tube, and means for directing the hot gases from said tube through the container to said stack.

Signed at Toledo, Ohio, this 26th day of December 1928.

LEONARD D. SOUBIER.